United States Patent
Wang

(10) Patent No.: US 8,107,159 B2
(45) Date of Patent: Jan. 31, 2012

(54) ELECTROPHORETIC DISPLAY

(75) Inventor: Patrick Shui Chung Wang, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 12/651,617

(22) Filed: Jan. 4, 2010

(65) Prior Publication Data

US 2010/0172015 A1 Jul. 8, 2010

(30) Foreign Application Priority Data

Jan. 7, 2009 (CN) .......................... 2009 1 0104842

(51) Int. Cl.
*G02B 26/00* (2006.01)
*G02B 26/08* (2006.01)
*G02F 1/29* (2006.01)

(52) U.S. Cl. ....................................... 359/296; 359/298

(58) Field of Classification Search .......... 359/290–292, 359/295, 296, 298
See application file for complete search history.

(56) References Cited

U.S. PATENT DOCUMENTS

| 7,719,757 B2 * | 5/2010 | Kanbe ........................... 359/296 |
| 2007/0141805 A1 * | 6/2007 | Chang et al. .................. 438/456 |
| 2009/0002803 A1 * | 1/2009 | Tonar et al. .................... 359/273 |

* cited by examiner

*Primary Examiner* — Ricky Mack
*Assistant Examiner* — Brandi Thomas
(74) *Attorney, Agent, or Firm* — Muncy, Geissler, Olds & Lowe, PLLC

(57) ABSTRACT

An electronic device includes a first substrate made of thin plastic sheet; a second substrate made of thin plastic sheet opposing the first substrate; a chamber formed between portions of the first and second substrates; and a sealing structure configured to seal the chamber at the interface between the first and second substrates, wherein the sealing structure surrounds the chamber and comprises a recess formed in one of the substrates and a protrusion formed on the other of the substrates, the protrusion engaging the recess.

13 Claims, 1 Drawing Sheet

ELECTROPHORETIC DISPLAY

CROSS REFERENCE TO RELATED APPLICATIONS

This non-provisional patent application claims priority under 35 U.S.C. §119(a) from Patent Application No. 200910104842.0 filed in The People's Republic of China on Jan. 7, 2009.

FIELD OF THE INVENTION

This invention relates to an electronic device and in particular, to a sealing structure of an electrophoretic display.

BACKGROUND OF THE INVENTION

An electrophoretic display (EPD) is a non-emissive device based on the electrophoresis phenomenon of charged pigment particles suspended in a dielectric solvent. The display usually comprises two substrates with electrodes placed opposing each other and separated by spacers. An electrophoretic fluid composed of a colored solvent with charged pigment particles dispersed therein is enclosed between the two electrodes. One of the electrodes on the viewing side is usually transparent. When a voltage difference is applied across the two electrodes, the pigment particles migrate to one side causing either the color of the pigment particles or the color of the solvent to be seen from the viewing side.

Known displays use an intermediate adhesive layer disposed between peripheries of the two substrates for sealing the electrophoretic fluid chambers. However, the adhesive layer is subject to aging and hardens losing its flexibility and may peel off from the substrates after being used for a long period, especially when used in environment with high temperature or subject to direct sunlight.

SUMMARY OF THE INVENTION

Hence there is a desire for an improved EPD which can solve the above mentioned problem.

Accordingly, in one aspect thereof, the present invention provides an electronic device comprising: a first substrate made of thin plastic sheet; a second substrate made of thin plastic sheet opposing the first substrate; a sealed chamber formed between portions of the first and second substrates; and a sealing structure configured to seal the chamber being formed at the interface between the first and second substrates, wherein the sealing structure surrounds the chamber and comprises a recess formed in one of the substrates and a protrusion formed on the other of the substrates, the protrusion being engaged in the recess.

Preferably, the electronic device further comprises two opposing electrodes attached to inner surfaces of the first and second substrates respectively, the chamber being formed between the two electrodes.

Preferably, the electronic device is an electrophoretic display, a plurality of microcapsules is received in the chamber and sandwiched between the electrodes, one of the substrates and a corresponding electrode attached thereon being made of transparent material.

Preferably, the microcapsules are bonded to each other by a binder.

Preferably, each of the microcapsules contains a dispersion comprising electrophoretic particles dispersed in a dispersion medium.

Preferably, the protrusion comprises a rib, and the recess comprises a groove.

Preferably, the rib and groove both have continuous configurations to thereby completely surround the chamber.

Preferably, the rib is comprised of discontinuous sections, gaps between the sections are sealed with adhesive layer.

Preferably, the sealing structure further comprises an adhesive layer spread at the interface.

Preferably, there are at least one additional spaced sealing structure arranged in the radial direction of the chamber to thereby provide multiple seals for the chamber.

Preferably, the protrusion comprises a plurality of bumps and the recess comprises a plurality of cavities.

Preferably, the protrusion is a press fit in the recess.

Preferably, the protrusion is secured in the recess by ultrasonic welding.

BRIEF DESCRIPTION OF THE DRAWINGS

A preferred embodiment of the invention will now be described, by way of example only, with reference to the single figure of the accompanying drawings, in which.

Figure 1:
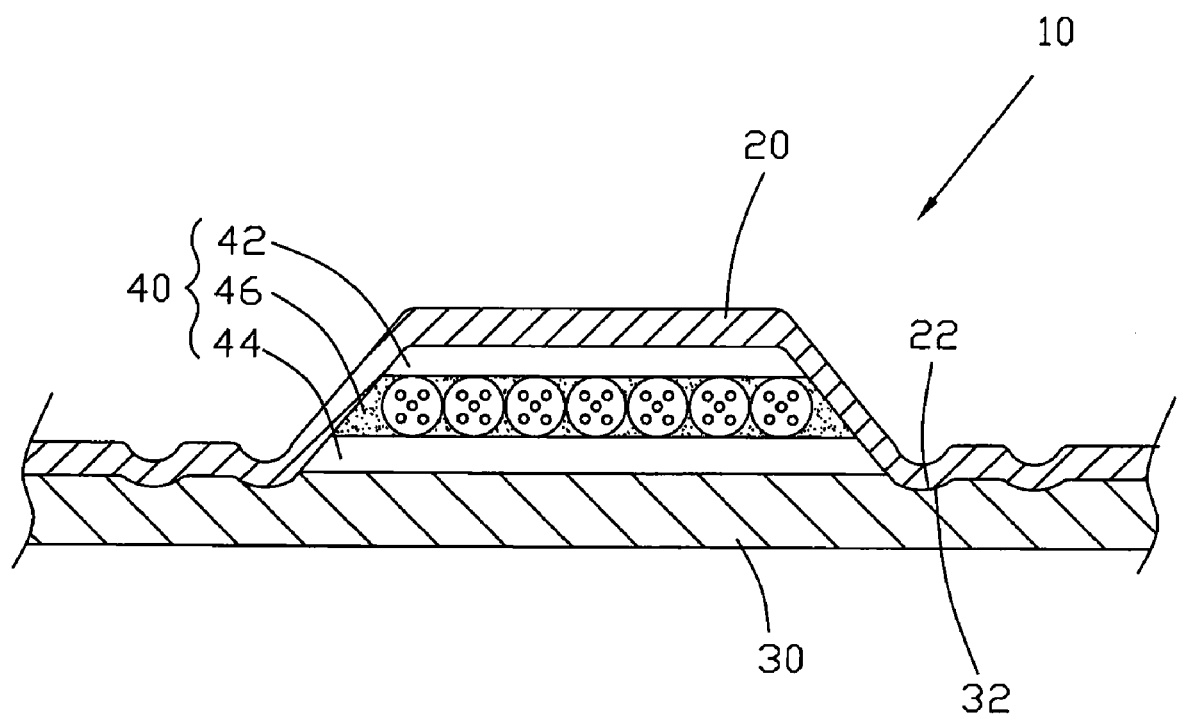
FIG. 1 is a cross sectional view of an electrophoretic display in accordance with the preferred embodiment of the present invention.

Dimensions of components and features shown in the figure are generally chosen for convenience and clarity of presentation and are not necessarily shown to scale.

DETAILED DESCRIPTION OF THE PREFERRED EMBODIMENTS

The technical problem to be solved, the technical solution and the beneficial effects of the present invention are best understood from the following detailed description with reference to the accompanying figure and embodiments. It is to be understood that, the specific embodiments described here are merely examples to explain the invention and are not intended to limit the present invention.

Referring to FIG. 1, an electrophoretic display 10 according to the preferred embodiment of the present invention comprises a first substrate 20, a second substrate 30 opposing the first substrate 20, and a display unit 40 disposed between the first and second substrates 20, 30. The first and second substrates 20, 30 may be made of thin plastic sheet.

The first substrate 20 is located close the viewing side and therefore made of transparent material. Preferably, the first substrate 20 is made of PET, PEN, PES, PC, or PE etc. A portion of the first substrate 20 corresponding to the display unit 40 is spaced from the second substrate 30 to thereby form a chamber therebetween. The display unit 40 is disposed in the chamber. The second substrate 30 may be made of transparent material or nontransparent material. Thus, in addition to PET, PEN, PES, PC, or PE, the second substrate 30 may be made of PI, PVC, PS or PP etc.

At least one sealing structure is formed at the interface of the first and second substrates 20, 30, surrounding the display unit 40. The sealing structure surrounds the chamber and comprises a recess formed at one of the substrates and a protrusion formed from the other of the substrates, the protrusion is secured in the recess. As shown in FIG. 1, the sealing structure may comprise a groove 32 formed in a surface of the second substrate 30 facing the first substrate 20, a rib 22 formed on a surface of the first substrate 20 facing the second substrate 30. The rib 22 is secured in the groove 32, to thereby form the sealing structure.

A method to form the sealing structure will now be described in detail. A rib 22 is formed at the periphery of a surface of the first substrate 20 facing the second substrate 30 by punching, pressing, rolling or other ways. The periphery of the first substrate 20 is engaged with the periphery of the second substrate 30 using a hot press. The periphery of the second substrate 30 corresponding to the rib 22 of the first substrate is deformed to form a groove 32. The rib 22 is pressed into the groove 32.

Alternatively, both the rib 22 and the groove 32 may be pre-formed before engagement. In another method the rib and groove may be formed together at the same time in a single step, whereby when the first substrate is overlaying the second substrate, a ridge is pressed from one substrate into the other to form the groove and to join the two substrates together. Additional mechanical connection means may be used to fix the rib 22 in the groove 32. For example, ultrasonic welding may be used to fix the rib 22 in the groove 32.

Alternatively, the positions of the rib 22 and groove 32 may be exchanged.

Preferably, an additional adhesive layer may be disposed at the interface between the first and second substrates 20, 30 before the rib 22 is fixed in the groove 32.

The rib 22 and groove 32 may have a continuous ring configuration, completely surrounding the display unit 40. Alternatively, the rib 22 and groove 32 may be composed of several discontinuous sections, mostly but not completely surrounding the display unit 40. An adhesive layer may be used to seal any gaps between adjacent sections.

The protrusion 22 of the sealing structure is not limited to a rib. For example, the protrusion 22 may comprises a plurality of discrete bumps, and the recess 32 may comprise a plurality of discrete holes or cavities corresponding to the bumps.

The display unit 40 comprises a first electrode 42 disposed at the inner surface of the first substrate 20, a second electrode 44 disposed at the inner surface of the second substrate 30, and an electrophoretic layer 46 disposed between the first and second electrodes 42, 44.

The electrodes 42, 44 may be made of ITO (Indium-Tin Oxide). The first electrode 42 is made of transparent material.

The electrophoretic layer 46 comprises a plurality of microcapsules. The microcapsules are sandwiched between the electrodes 42, 44 and bonded to each other by a binder. In each of the microcapsules is sealed a dispersion comprising electrophoretic particles dispersed in a dispersion medium in advance by a micro capsulation technique. When a voltage difference is imposed between the two electrodes 42, 44, the particles migrate closer one of the electrodes 42, 44 causing either the color of the particles or the color of the dispersion medium to be seen from the viewing side.

Alternatively, each microcapsule may enclose therein two kinds of charged particles of different colors, for example, one kind of particle is made of $TiO_2$ in white and the other kind of particle is made of black carbon. When a voltage difference is applied between the two electrodes 42, 44, the black particles migrate closer the first electrode 42 causing the color of the black particles to be seen from the viewing side.

Alternatively, the sealing structure of the present invention may also be used to seal a chamber formed between two thin plastic sheets of other electric devices.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electronic device comprising:
   a first substrate made of thin plastic sheet;
   a second substrate made of thin plastic sheet opposing the first substrate;
   a chamber formed between portions of the first and second substrates;
   two opposing electrodes attached to inner surfaces of the first and second substrates respectively, the chamber being formed between the two electrodes; and
   a sealing structure arranged to seal the chamber being formed at the interface between the first and second substrates, wherein the sealing structure surrounds the chamber and comprises a recess formed at one of the substrates and a protrusion formed from the other of the substrates, the protrusion being engaged in the recess;
   wherein the electronic device is an electrophoretic display, a plurality of microcapsules is received in the chamber and sandwiched between the electrodes, one of the substrates and a corresponding electrode attached thereon being made of transparent material, and
   wherein at least one additional spaced sealing structure is arranged in the radial direction of the chamber and surrounding the chamber to thereby provide multiple seals for the chamber in the radial direction of the chamber.

2. The electronic device of claim 1, wherein the microcapsules are bonded to each other by a binder disposed in the chamber.

3. The electronic device of claim 1, wherein each of the microcapsules contains a dispersion comprising electrophoretic particles dispersed in a dispersion medium.

4. The electronic device of claim 1, wherein the protrusion comprises a rib, and the recess comprises a groove.

5. The electronic device of claim 4, wherein the rib and groove both have continuous configurations to thereby completely surround the chamber.

6. The electronic device of claim 4, wherein the rib is comprised of discontinuous sections, gaps between the sections are sealed with adhesive layer.

7. The electronic device of claim 1, wherein the sealing structure further comprises an adhesive layer at the interface.

8. The electronic device of claim 1, wherein the protrusion comprises a plurality of bumps and the recess comprises a plurality of cavities.

9. The electronic device of claim 1, wherein the protrusion is a press fit in the recess.

10. The electronic device of claim 1, wherein the protrusion is secured in the recess by ultrasonic welding.

11. An electronic device comprising:
    a first substrate made of thin plastic sheet;
    a second substrate made of thin plastic sheet opposing the first substrate;
    a chamber formed between portions of the first and second substrates;
    two opposing electrodes received in the chamber and attached to inner surfaces of the first and second substrates respectively;
    a plurality of microcapsules received in the chamber and sandwiched between the electrodes; and
    a sealing structure arranged to seal the chamber being formed at the interface between the first and second substrates;

wherein the sealing structure surrounds the chamber and comprises a protrusion protruding from a surface of one of the substrates and a recess formed in the other of the substrates, the protrusion being engaged in the recess, another recess being formed in an opposing surface of said one of the substrates at a position corresponding to the protrusion.

12. A method of making an electronic device which comprises a first substrate made of thin plastic sheet; a second substrate made of thin plastic sheet opposing the first substrate, a chamber formed between portions of the first and second substrates; and a sealing structure arranged to seal the chamber being formed at the interface between the first and second substrates, wherein the sealing structure surrounds the chamber and comprises a recess formed at one of the substrates and a protrusion formed from the other of the substrates, the protrusion being engaged in the recess, wherein the method comprises steps of:

forming the protrusion at the periphery of a first surface of the first substrate facing the second substrate; and engaging the periphery of the first substrate with the periphery of a surface of the second substrate by pressing the protrusion into the second substrate using a hot press to form the recess in the second substrate and to engage the protrusion in the recess.

13. The method of Claim 12, wherein the forming step includes forming another recess in a second surface of the first substrate at a position corresponding to the protrusion.

* * * * *